Dec. 18, 1962 L. J. HIRTH ET AL 3,069,480
PROCESS FOR CHLOROMETHYLATING AROMATIC HYDROCARBONS
Filed June 29, 1959
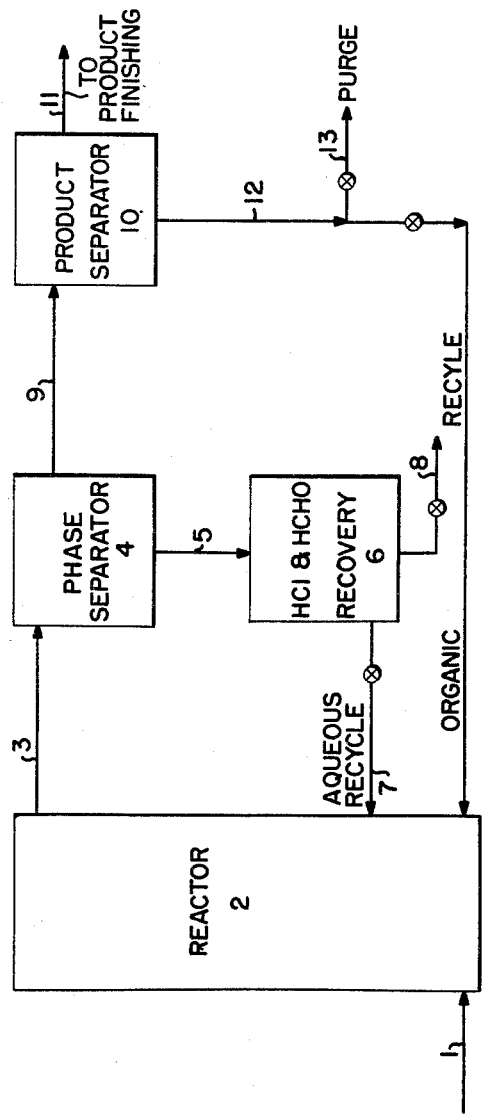
Leo J. Hirth
Maurice Spielman        Inventors
Clarence Robert Landgren
By *Seymour Stahl* Patent Attorney 3,069,480
PROCESS FOR CHLOROMETHYLATING
AROMATIC HYDROCARBONS
Leo J. Hirth, Watchung, Maurice Spielman, Roselle, and Clarence Robert Landgren, Morristown, N.J., assignors to Esso Research and Engineering Company, a corporation of Delaware
Filed June 29, 1959, Ser. No. 823,605
7 Claims. (Cl. 260—651)

This invention relates to a process for the haloalkylation of aromatic compounds.

In particular, this invention relates to a process for the chloromethylation of benzene and alkyl substituted benzenes.

More particularly, this invention relates to a process for the chloromethylation of tri- and tetramethyl benzene derivatives wherein the reactants and the products of reaction are maintained in liquid phase until after the aromatic components of the reaction mixture are separated from the aqueous phase of such mixture.

The chloromethylation of benzene and alkyl derivatives of benzene with formaldehyde and hydrogen chloride has long been known to the art. The reaction may be carried out without the aid of a catalyst but the rate of reaction in such a process is too slow for industrial production. It is also known in the art to employ an acidic chloromethylation catalyst such as aluminum chloride, stannic chloride, zinc chloride, etc. to accelerate the reaction.

A major problem in the development of an efficient continuous process for chloromethylating benzenes results from the fact that many of the chloromethylated benzene derivatives are solids which have melting points ranging from about 60° C. to 200° C. (140°–392° F.), i.e. within the temperature range suitable for carrying out the reaction. For example, the melting points of various chloromethylation products of the type referred to are:

| | Melting point, ° C. |
|---|---|
| Monochloromethyl durene | 65–6 (150° F.) |
| Bischloromethyl durene | 193–4 (380° F.) |
| Bischloromethyl mesitylene | 105–6 (222° F.) |
| 2,5-bischloromethyl para xylene | 134 (273° F.) |

The high melting reaction products are difficult to handle in that they tend to form, upon cooling, a hard, solid mass which entraps a large amount of the aqueous phase of the reacting system. It is often quite difficult to remove such solids from the reactor. The existence of such solids presents difficulties in product purification even with batch processes. It naturally follows that an efficient continuous process must include a means of avoiding or materially reducing the same problems.

It has now been discovered that an efficient process for chloromethylating benzene and alkyl substituted benzenes can be effected by carrying out the chloromethylation reaction in the presence of an inert solvent employed in sufficient quantities to maintain the reaction products in liquid form at the temperatures and pressures of reaction and subsequently separating the chloromethylated aromatic products from the aqueous phase of the reaction mixture while maintaining the reaction mixture at reaction temperature and pressure conditions.

This invention may be employed with either a batch or continuous process but is of particular advantage in a continuous process.

The term "inert solvent" is used herein to mean a liquid in which the products obtained in the chloromethylation of benzene and alkyl substituted benzenes are completely soluble at reaction temperatures and pressures and which is "inert" (non-reactive) to the chloromethylation reaction under the conditions of reaction hereinafter set forth in detail. Solvents suitable for this purpose include $C_5$ to $C_{30}$ acyclic alkanes, $C_5$ to $C_{12}$ cyclic alkanes, and substituted alkanes and mononuclear aromatic hydrocarbons which are liquids at reaction temperatures and pressures and wherein one or more hydrogen atoms are replaced by a chlorine atom or a $-NO_2$ group, e.g. nitrobenzene. Of the hydrocarbon solvents $C_6$ to $C_{12}$ acyclic alkanes are preferred. Among the chlorinated solvents suitable for this purpose are carbon tetrachloride, trichloroethane, and para dichlorobenzene.

In accordance with the present invention the reactor effluent is separated into an aqueous phase and an organic phase. This separation may be made by simple gravity settling, by centrifugation, or by any conventional method of separating water or a water comprising liquid from an organic liquid. The aqueous phase containing HCl, formaldehyde, and catalyst may be recycled to the reactor, purged, or sent to a distillation or extraction unit for recovery of one or more of its components. The chloromethylated products are then crystallized and recovered from the organic phase. This separation may be effected by filtration, centrifugation, or any other suitable technique for separating liquids from solids. In one embodiment of this invention the separation of chloromethylated products from the organic phase is effected by distillation. The remainder of the organic phase comprising solvent, unreacted aromatic feedstock, intermediate compounds and some of the chloromethylated product is preferably recycled to the reactor.

Representative compounds which may be chloromethylated in accordance with the present invention either alone or in admixture with each other include benzene; methyl benzenes (e.g., toluene, ortho-, meta-, or para-xylene; trimethyl benzenes such as pseudocumene, mesitylene, or hemimellitene; tetramethyl benzenes such as durene, prehnitene, and isodurene; and pentamethyl benzenes); ethyl benzenes; propyl and isopropyl benzenes; butyl benzenes; tertiary butyl benzenes; isobutyl benzenes, etc.; as well as polynuclear aromatics such as di- and triphenyl methanes, naphthalenes, phenanthrenes, anthracenes, etc. The feedstock may consist of the aromatic hydrocarbon to be chloromethylated or may comprise a mixture of such aromatic hydrocarbons with non-reactive hydrocarbons such as paraffins, naphthenes, etc.

The amount of formaldehyde to be employed may be varied according to the extent to which the aromatic hydrocarbon feedstock is to be chloromethylated. Thus amounts in the range of about 0.5 to 6, preferably 2 to 6, mols of formaldehyde may be used per mol of aromatic hydrocarbon feedstock. The formaldehyde may be introduced as gaseous formaldehyde, an aqueous solution, e.g. 2 to 100%, of formaldehyde such as formalin, or in the form of a substance which engenders formaldehyde, such as paraformaldehyde or trioxane.

Hydrogen chloride may be introduced as a hydrochloric acid in any concentration above about 5 wt. percent up to and including hydrogen chloride gas or in the form of a compound which engenders hydrogen chloride. It is preferred to introduce the hydrogen chloride as a saturated hydrochloric acid solution. The amount of hydrogen chloride employed may be in the range of about 1 to 14, preferably 5 to 10, mols of hydrogen chloride per mol of aromatic hydrocarbon feed.

The acidic catalysts which are suitable for use with this invention include zinc chloride, sulfuric acid, stannic chloride, boron trichloride, phosphoric acid, and acetic acid. Of these, zinc chloride is preferred. The catalyst is employed in the range of about 0.02 to 3, preferably 0.3 to 1.0, mols of catalyst per mol of aromatic hydrocarbon feedstock.

The amount of solvent to be employed will vary according to the temperature and pressure in the reactor and with the solubility of the particular product and the particular solvent employed. The amount of solvent to be employed may vary from about 1 to 100, preferably 2 to 10, mols of solvent per mol of aromatic hydrocarbon feedstock.

The invention may be more easily understood by referring to the accompanying drawing which represents a flow plan for one embodiment of this invention.

In this embodiment the reactants are introduced continuously into reactor 2 via line 1 and comprise aromatic hydrocarbons, hydrogen chloride, formaldehyde, zinc chloride, heptane, and water in amounts within the ratios hereinbefore set forth. The reactants may be premixed and introduced in a single stream as shown in the drawing. Or, in the alternative, each reactant may be introduced separately or in any other combination of the individual reactants.

Reactor 2 should be adapted to withstand elevated pressures of the order of 1 to 50 atmospheres and temperatures up to 400° F. or higher. The interior of the reactor must be acid resistant and may be made of suitable metal alloys such as chrome steels and the like, or lined with such alloys or with enamel, carbon, karbate, stoneware, glass, acid-resitsant brick, and the like.

The temperature in reactor 2 is maintained within the range of about 70 to 400, preferably 220 to 350° F., and at a pressure in the range of 0.5 to 50, preferably 5 to 15, atmospheres. Reactor 2 should be equipped with a means of agitation for maintaining the solvent and the reactants in a well mixed state to avoid phase separation. This mixing may be effected by conventional, mechanical stirring equipment or any conventional mixing means which will effect turbulence in the reaction mixture. For instance, another means such as a conventional pump-around arrangement may be employed in addition to stirring or other agitation means, or in lieu thereof.

The residence time for the reaction mixture in reactor 2 should be in the range of about 0.1 to 12 hours, preferably 0.5 to 4 hours. The effluent from reactor 2 is removed via line 3 to phase separator 4 maintained at a temperature and pressure within the ranges heretobefore set forth for reactor 2 which will maintain the particular reaction mixture involved in the liquid state. Phase separator 4 may be either a simple gravity settling tank which may or may not also be equipped with a filtration means or phase separator 4 may be any conventional apparatus, e.g. a centrifuge, designed to effect the separation of a liquid organic mixture from a water comprising liquid phase.

In the embodiment shown in the drawing, the reaction mixture is separated in phase separator 4 into an upper organic phase comprising chloromethylation products, unreacted aromatic feedstock, and solvent, and a lower aqueous phase comprising hydrogen chloride, formaldehyde, catalyst and water. The aqueous phase is removed from phase separator 4 via line 5 to recovery vessel 6. From this vessel the aqueous phase may be recycled to reactor 2 via line 7. In the alternative, the aqueous phase or a portion thereof may be purged via line 8 if an undesirably high concentration of water builds up in the system. This stream may then be subjected to a distillation or extraction unit for recovery of one or more of its components. The organic phase afore referred to is removed from phase separator 4 via line 9 to product separator 10 wherein the chloromethylation product desired is separated from the remainder of the organic phase, i.e. the mother liquor.

In product separator 10, the organic phase is cooled to a temperature which will effect the selective crystallization of the desired chloromethylation product. In other words, the organic phase is cooled to a temperature which is low enough to allow the desired chloromethylation product to crystallize, but at the same time is high enough to maintain the remainder of the organic phase in the liquid state. This will, of course, vary somewhat with the crystallization point of the chloromethylation product desired and the crystallization point of the other components in the reaction mixture. In general, this temperature will be in the range of 0 to 350° F. In particular applications, the temperature will be lowered to approximately 1 to 10° F. below the crystallization temperature of the deisred chloromethylation product. The pressure which may be maintained in the products separated will be within the same broad range as before set forth for reactor 2. However, the preferred pressure for the product separator is atmospheric pressure. The separation of the crystallized chloromethylation product with entrained amounts of mother liquor from the remainder of the organic phase is effected by filtration or by any conventional means of separating the solid substance from a liquid, such as centrifugation. The crystallized chloromethylated product will then be removed from the product separator 10 via exit 11 from whence it is passed to product finishing steps for final purification. Final purification may be effected by a conventional recrystallization process or various other purification techniques well known to the art.

The uncrystallized portion of the organic phase is removed from separator 10 via line 12 through which it will ordinarily be recycled to reactor 2. In the alternative, this stream or portions thereof may be purged from the system via line 13. However, the combination of this recycle of the uncrystallized portion of the organic phase and the employment of the preferred inert solvents provides a smooth flowing continuous process not available in the prior art.

*Example I*

A reaction mixture consisting of durene, saturated hydrochloric acid, aqueous formaldehyde, i.e. formalin, heptane, and zinc chloride are charged to a glass-lined reactor such as hereinbefore described, in a molar ratio of 1:6:5:5:1, with the acid and aldehyde therein calculated as pure hydrogen chloride and formaldehyde. The reactor is maintained at a temperature of 100–110° C. (212–230° F.) and a pressure of 5 atmospheres. The residence time in the reactor for this mixture is 2–4 hours. The reaction mixture is continuously removed from the reactor and passed to a separation vessel where it is allowed to settle, thereby forming an upper organic phase and a lower aqueous phase during which time said mixture is maintained at a temperature of 100–110° C. (212–230° F.) under pressure of 5 atmospheres. A stream is continuously withdrawn from the aqueous phase and recycled to the reactor. The organic phase is continuously removed to a product separator wherein it is cooled to a temperature of about 30° C. (86° F.) At this temperature bis-chloromethyl durene crystallizes from the organic phase and is removed for final purification. The remainder of the organic phase is continuously withdrawn from the product separator and recycled to the said reactor.

*Example II*

The process employed in Example I is utilized to produce trichloromethylmesitylene following the same steps as set forth in Example I, except that cyclohexane is employed as the solvent. Mesitylene is employed as the aromatic hydrocarbon, the reactor is maintained at a temperature of about 100° C. (212° F.) under pressure of 5 atmospheres, and after separation from the aqueous components of the reaction mixture, the organic phase is cooled to a temperature of about 20° C. (68° F.).

*Example III*

A chloromethylated derivative of durene is produced exactly as in Example I except that nitrobenzene is employed as the solvent.

Example IV

A chloromethylated derivative of mesitylene is produced exactly as in Example II except that carbon tetrachloride is employed as the solvent.

Example V

A chloromethylated derivative of durene is produced exactly as in Example I except that a pressure of 10 atmospheres is employed.

All percentages recited herein unless otherwise designated shall be construed to mean percent by weight.

What is claimed is:

1. A continuous process for chloromethylating durene which comprises continuously introducing durene, formaldehyde, hydrogen chloride, water, an acidic chloromethylation catalyst, and an inert solvent into a reaction zone under chloromethylation reaction conditions wherein a temperature in the range of about 220° to 350° F. and a pressure in the range of about 5 to 15 atmospheres are maintained thereby forming a reaction mixture, converting at least a portion of said durene to a chloromethyl derivative of said durene, continuously passing said reaction mixture from said reaction zone into a phase separating zone, maintaining said reaction mixture in said phase separating zone under said chloromethylation reaction conditions until said reaction mixture separates into an aqueous phase and an organic phase, continuously removing said aqueous phase from said organic phase, recovering said chloromethyl derivative from said organic phase and recycling the remainder of said organic phase to said reaction zone, said inert solvent being present in said reaction mixture in an amount sufficient to maintain said reaction mixture in the liquid state until said aqueous phase is separated from said reaction mixture.

2. A process in accordance with claim 1 wherein said formaldehyde and said water are introduced as an aqueous solution of formaldehyde.

3. A process in accordance with claim 1 wherein said hydrogen chloride and said water are introduced as hydrochloric acid.

4. A process in accordance with claim 1 wherein said chloromethylation catalyst is zinc chloride.

5. A process in accordance with claim 1 wherein said solvent is selected from the group consisting of $C_5$ to $C_{30}$ acyclic alkanes, $C_5$ to $C_{12}$ cyclic alkanes, nitrobenzene, dinitrobenzene, carbon tetrachloride, trichloroethane, and para dichlorobenzene.

6. A process in accordance with claim 1 wherein said chloromethylation catalyst is a catalyst selected from the group consisting of aluminum chloride, zinc chloride, and stannic chloride.

7. A continuous process for chloromethylating durene which comprises continuously introducing durene, formaldehyde, hydrogen chloride, water, an acidic chloromethylation catalyst, and an inert solvent into a reaction zone to form therein a reaction mixture comprising 2 to 6 moles of formaldehyde, 5 to 10 moles of hydrogen chloride and 0.3 to 1 mole of zinc chloride per mole of durene, maintaining said reaction mixture under chloromethylation conditions including a temperature in the range of about 220° to 350° F. and a pressure in the range of about 5 to 15 atmospheres, continuously removing the resulting water-containing reaction mixture from said reaction zone to a separation zone and maintaining said reaction mixture under said chloromethylation conditions until an aqueous phase is separated from an organic phase, continuously removing said aqueous phase from said separation zone, recovering bis-chloromethyl durene from said organic phase and recycling the remainder of said organic phase to said reaction zone, said inert solvent being present in said reaction mixture in an amount sufficient to maintain said reaction mixture in the liquid state until said aqueous phase is separated from said reaction mixture.

References Cited in the file of this patent

UNITED STATES PATENTS

| | | |
|---|---|---|
| 2,850,542 | Heisenberg et al. | Sept. 2, 1958 |
| 2,859,253 | Snow | Nov. 4, 1958 |
| 2,873,299 | Mikeska | Feb. 10, 1959 |

FOREIGN PATENTS

| | | |
|---|---|---|
| 751,053 | Great Britain | June 27, 1956 |